(12) United States Patent
Sawada et al.

(10) Patent No.: US 8,184,958 B2
(45) Date of Patent: May 22, 2012

(54) AUDIO-VIDEO PLAYER AND EVENT DETERMINATION DEVICE

(75) Inventors: Hideyuki Sawada, Neyagawa (JP); Hiroyuki Fukuma, Neyagawa (JP); Dai Shimozawa, Neyagawa (JP)

(73) Assignee: Onkyo Corporation, Osaka (JP)

( * ) Notice: Subject to any disclaimer, the term of this patent is extended or adjusted under 35 U.S.C. 154(b) by 1421 days.

(21) Appl. No.: 11/742,605

(22) Filed: May 1, 2007

(65) Prior Publication Data

US 2008/0025707 A1 Jan. 31, 2008

(30) Foreign Application Priority Data

Jul. 27, 2006 (JP) .................................. 2006-204339
Mar. 12, 2007 (JP) .................................. 2007-61715

(51) Int. Cl.
*H04N 5/84* (2006.01)
*H04N 5/77* (2006.01)
*H04N 5/92* (2006.01)

(52) U.S. Cl. ........ 386/335; 386/358; 386/359; 386/326; 386/263; 386/244

(58) Field of Classification Search .................. 386/335, 386/358, 326, 244, 263, 359
See application file for complete search history.

(56) References Cited

U.S. PATENT DOCUMENTS

| | | | | |
|---|---|---|---|---|
| 5,371,553 A * | 12/1994 | Kawamura et al. | ............. | 725/59 |
| 5,418,719 A | 5/1995 | Abe et al. | | |
| 5,621,659 A * | 4/1997 | Matsumoto et al. | ............. | 710/10 |
| 5,699,486 A | 12/1997 | Tullis et al. | | |
| 6,738,559 B1 * | 5/2004 | Yoo et al. | ........................ | 386/231 |
| 6,848,997 B1 * | 2/2005 | Hashimoto et al. | ............. | 463/42 |
| 7,298,424 B2 * | 11/2007 | Oh | .................................. | 348/706 |
| 7,554,614 B2 * | 6/2009 | Satou | .............................. | 348/734 |
| 7,812,889 B2 * | 10/2010 | Chien et al. | ..................... | 348/569 |
| 2002/0197056 A1 * | 12/2002 | Morikawa | ........................ | 386/46 |
| 2005/0132055 A1 * | 6/2005 | Neogi | ............................. | 709/227 |
| 2005/0141857 A1 * | 6/2005 | Shimozawa et al. | ............ | 386/46 |
| 2006/0104617 A1 | 5/2006 | Mukaide et al. | | |
| 2008/0007616 A1 * | 1/2008 | Baladhandayuthapani | | 348/14.12 |

FOREIGN PATENT DOCUMENTS

| | | |
|---|---|---|
| JP | 59-27672 | 2/1984 |
| JP | 62-067470 | 3/1987 |
| JP | 03-066089 | 3/1991 |
| JP | 05-216723 | 8/1993 |
| JP | 05-274075 | 10/1993 |
| JP | 06-169435 | 6/1994 |
| JP | 07-131867 | 5/1995 |
| JP | 07-200382 | 8/1995 |
| JP | 2001-202268 | 7/2001 |
| JP | 2001-319417 | 11/2001 |
| JP | 2006-129261 | 5/2006 |
| JP | 2006-246300 | 9/2006 |

* cited by examiner

*Primary Examiner* — Helen Shibru
(74) *Attorney, Agent, or Firm* — Renner, Otto, Boisselle & Sklar, LLP

(57) ABSTRACT

An audio-video player, which automatically determines an event corresponding to the current state and displays a preferred message associated with the event, is provided. A DVD player includes: a massage table which stores prescribed messages in advance by associating them with a plurality of events having prescribed priorities; an event determination unit which sequentially determines whether the current state corresponds to an event, starting from an event of higher priority; and a message display control unit which reads out, when the event determination unit found the corresponding event, a prescribed message associated with the corresponding event from a message table and displays it.

8 Claims, 15 Drawing Sheets

FIG. 2

| ID | MESSAGE CONTENTS |
|---|---|
| 001 | Setting operation trouble may be caused. Please restart. |
| 002 | Please set HDMI output to ON. |
| 003 | Please connect the cable correctly, and turn the power of the connected HDMI equipment ON. |
| 004 | Setting operation trouble is caused. (Hot plug is not recognized.) |
| 005 | HDCP authentication is now underway. Please wait. |
| 006 | HDCP authentication is failed. Please check if the connected equipment does not support HDCP. |
| 007 | Setting operation problem is caused. (Authentication does not start.) |
| 008 | Please set HDMI setting to AUTO. |
| 008b | Output is currently performed with resolution receivable by the receiver. Please check video input setting of the connected HDMI equipment. (Video is currently outputted with HDMI resolution=AUTO. If there is any problem, please set to 480p.) |
| 011 | Please set downsampling to ON. |
| 012 | Connected equipment does not support bit stream audio (Dolby Digital, etc.), so audio cannot be outputted. Please change HDMI output setting to PCM output. |
| 013 | Please check volume setting and input setting of the connected equipment. (Bit stream (Dolby D, etc.) audio is currently outputted.) |
| 014 | PCM audio of 48k/16bit or higher is being outputted. Please check volume setting and input setting of the connected equipment. Please check if output is possible by setting downsampling to ON. |
| 015 | If normal HDMI equipment is connected, there is no problem in the settings. |
| 016 | HDMI connecting equipment does not support DTS, so DTS audio cannot be outputted. |
| 016b | Please set HDMI audio output setting of this equipment to ALL. |
| 017 | Please check volume setting and input setting of the connected equipment. (DTS audio is currently outputted.) |
| 018 | Please set HDMI audio output setting of this equipment to ALL. |
| 019 | Please check volume setting and input setting of the connected equipment. (MPEG audio is currently outputted.) |
| 020 | SACD audio cannot be HDMI outputted. |
| 021 | Please check if HDMI audio output setting is ON. Does HDMI connecting equipment support audio output? |
| 101 | Please confirm the disc being played contains audio correctly. |
| 030 | Connected HDMI equipment does not support this format. Please change Digital Out setting to PCM setting. |
| 031 | HDMI connecting equipment does not support this playing format. Please change to digital connection or analog connection. |
| 032 | Please set downsampling setting to ON. |
| 033 | HDMI equipment does not support this frequency. Please change to digital connection or analog connection. |

AUDIO-VIDEO PLAYER AND EVENT DETERMINATION DEVICE

BACKGROUND OF THE INVENTION

1. Field of the Invention

The present invention relates to an event determination device and an audio-video player, which determine an event corresponding to the current state and display a message associated with the event.

2. Description of Related Art

Recently, DVD players, AV amplifiers and display devices conforming to the HDMI standard have been used. A DVD player is connected to an AV amplifier via an HDMI cable, and the AV amplifier is connected to a display device via an HDMI cable. The DVD player reads out audio data and video data from a DVD disc, and converts them to HDMI data and transmits it to the AV amplifier via the HDMI cable. The AV amplifier converts the received HDMI data to the original video data and audio data, and supplies the audio data to a speaker, and reconverts the video data to HDMI data and transmits it to the display device. The display device converts the received HDMI data to the original video data, and displays the video. Note that a DVD player may be connected to a display device directly via an HDMI cable.

In such a system, settings of a DVD player (e.g., HDMI connection, selection of output audio format and output selector, resolution setting), carried out by a user, are very difficult for the user. If the user carried out wrong settings, a problem that audio is not played from the speaker or video is not played on the display device is caused. If such a problem is caused, in order to solve the problem, it is the only way for the user to carefully read the instruction manual provided with the DVD player so as to consider the coping measures, or to contact the help desk, which is very troublesome.

Japanese Patent Application Laid-Open No. 5-274075 describes the following art. That is, when a help request is given, one of help files 1-1 to 1-$n$ for display is selected corresponding to the system state of that time by a selection unit 2. From the help file selected, a character string part, which is the subject of audio output, is extracted by an audio output subject part extraction unit 6 in line units. The extracted character string part is converted to audio data by an audio data converter 7 by using an audio conversion library 8, and with a control by an audio output controller 9, it is outputted as audio from an audio output device 10. In parallel, a display output subject part is extracted from the selected help file by a display output subject part extraction unit 3, and is display-outputted from the display device 5.

However, Japanese Patent Application Laid-Open No. 5-274075 fails to describe a method of selecting a help file corresponding to the system state specifically. Further, it does not describe a method of selecting a help file in HDMI data transmission. Moreover, according to the art, only one help file is selected. Therefore, when it is applied to a DVD player, if a plurality of help files exists corresponding to the system state, an undesirable help file may be selected so that a problem cannot be solved.

SUMMARY OF THE INVENTION

The present invention has been developed to solve the conventional problem described above. It is therefore an object of the present invention to provide an audio-video player which automatically determines an event corresponding to the current state and displays a preferred message associated with the event.

It is another object of the present invention to provide an audio-video player conforming to the HDMI standard, which determines an event corresponding to the current state and displays the associated message.

An audio-video player according to a preferred embodiment of the present invention includes: a playback unit which plays audio data and video data; a transmission unit which transmits audio data and video data to an audio-video receiver connected outside; a message storing unit which stores prescribed messages in advance by associating them with a plurality of events with prescribed priorities; an event determination unit which sequentially determines whether each of the events correspond, starting from an event of higher priority; and a display unit which reads out a prescribed message associated with a corresponding event from the message storing unit when the event determination unit found the corresponding event, and displays it.

When the event determination unit automatically determines whether the current state (state and condition of the audio-video player and/or audio-video receiver) corresponds to an event and finds the corresponding event, a message associated with the event found is displayed. Therefore, the user can set the audio-video player or the audio-video receiver correctly with reference to the message. A plurality of events is prioritized, and the event determination unit sequentially determines whether each of the events corresponds, starting from an event of higher priority. Accordingly, one message which is considered as the most appropriate, determined from the current state, can be selected and displayed, so even if there are a plurality of corresponding events, it is possible to prevent an inappropriate message from being displayed as the case of a conventional one. Note that a message may be a message itself or a message ID (identification number) indicating the content of the message.

Preferably, the events include a first event relating to transmission of audio data and video data of the audio-video player, and a second event relating to reception of audio data and video data of the audio-video receiver of lower priority than that of the first event.

Since the audio-video player determines events, events relating to the audio-video player itself can be determined in more detail and more accurately than events relating to the audio-video receiver. Accordingly, by giving higher priority to the events relating to the audio-video player, events relating to the audio-video player are determined first. Therefore, a more accurate message can be displayed.

Preferably, the first event includes a third event relating to transmission of audio data of the audio-video player and a fourth event relating to transmission of video data of the audio-video player having lower priority than that of the third event, and the second event includes a fifth event relating to reception of audio data of the audio-video receiver and a sixth event relating to reception of video data of the audio-video receiver having lower priority than that of the fifth event.

The setting of audio data includes more setting items than that of video data, and is difficult for the user, so incorrect setting may be caused more likely. Accordingly, by setting priorities of the events relating to audio data to be higher than those of the events relating to reception of video data, events relating to audio data are determined first. Therefore, a more accurate message can be displayed.

Preferably, the events further include a seventh event having higher priority than those of the first event and the second event, relating to a connection between the audio-video player and the audio-video receiver.

The reason why an event relating to a connection between the audio-video player and the audio-video receiver is given the highest priority is that even if a message is displayed for another event, the message will be meaningless unless this event is solved.

Preferably, the audio-video player further includes a resolution conversion unit which converts resolution of video data played by the playback unit, and the fourth event or the sixth event is an event relating to resolution to be converted by the resolution conversion unit.

Preferably, the audio-video player and the audio-video receiver conform to the HDMI standard, and the transmission unit converts audio data and video data played by the playback unit to HDMI data conforming to the HDMI standard and transmits it to the audio-video receiver. The third event includes an event that the transmission unit is outputting HDMI data. If the current state corresponds to an event that the transmission unit outputs HDMI data, the event determination unit ends determination of the third event, and determines the fourth event.

If an event that the transmission unit is outputting HDMI data is determined first in the third event and the current state corresponds to the event, determination processing for the third event is ended, and determination processing proceeds to the fourth event. This is because no problem has been caused since HDMI data is being outputted. Note that by setting the priority of the event higher, there is no need to determine other events. This can shorten the time taken for the determination processing.

Preferably, the third event further includes an event that the transmission unit is not outputting audio data, and an event relating to audio data played by the playback unit. If the current state does not correspond to an event that the transmission unit is outputting HDMI data, but corresponds to an event that the transmission unit is not outputting audio data, the event determination unit determines an event relating to audio data being played by the playback unit.

If the transmission unit is not outputting audio data, it is expected that the audio data itself being played by the playback unit involves a problem. Therefore, by determining an event relating to the audio data being played by the playback unit, a preferred message can be displayed.

Preferably, the third event further includes an event that the format of audio data outputted by the transmission unit is PCM, and an event that the sampling frequency of PCM audio data outputted by the transmission unit is not a prescribed frequency. If the current state does not correspond to an event that the transmission unit is outputting HDMI data and an event that the transmission unit is not outputting digital audio data, but corresponds to an event that the format of the audio data outputted by the transmission unit is PCM, the event determination unit determines an event that the sampling frequency of the PCM audio data outputted by the transmission unit is not a prescribed frequency.

If the transmission unit is outputting digital audio data and also outputting PCM audio data, it is expected that the sampling frequency of PCM audio data involves a problem. Accordingly, by determining an event relating to the sampling frequency of PCM audio data, a preferred message can be displayed.

Preferably, the fifth event includes an event that the format of audio data of HDMI data outputted by the transmission unit is a prescribed format.

If the format of audio data of HDMI data outputted by the transmission unit is a prescribed format, it is expected that the audio-video receiver does not support the prescribed format, so the processing cannot be performed. Accordingly, by determining whether the current state corresponds to the event, a preferred message can be displayed.

Preferably, in the case that the current state corresponds to the first event, the display unit displays a message urging the user to change the setting of the audio-video player based on the event relating to the audio-video player, and in the case that the current state corresponds to the second event, the display unit displays a message urging the user to change the setting of the audio-video receiver based on the event relating to the audio-video player.

Preferably, in the case that the current state corresponds to the seventh event, the display unit displays a message for an error in the connection or authentication between the audio-video player and the audio-video receiver, or for a problem in the setting of the audio-video player.

As described above, it is also a characteristic of the present invention to display a message relating to an error in connection or authentication or relating to the setting content according to the event type, besides a mere error display.

Preferably, the audio-video player further includes an acquisition unit which acquires setting information of the audio-video receiver, from the audio-video receiver. The events further include an eighth event relating to reception of audio data of the audio-video receiver based on the setting information, a priority of which is higher than that of the fifth event but lower than that of the fourth event.

The event determination device of the present invention sequentially determines whether each of the events corresponds, starting from an event of higher priority, and displays a message associated with the corresponding event. Therefore, a preferred message can automatically be selected and displayed.

BRIEF DESCRIPTION OF THE DRAWINGS

FIG. 2 shows a message table;

DESCRIPTION OF THE PREFERRED EMBODIMENTS

Hereinafter, a DVD player (event determination device, audio-video player) and an AV amplifier (audio-video receiver), according to preferred embodiments of the present invention, will be described specifically with reference to the drawings. However, the present invention is not limited to these embodiments.

Figure 1:
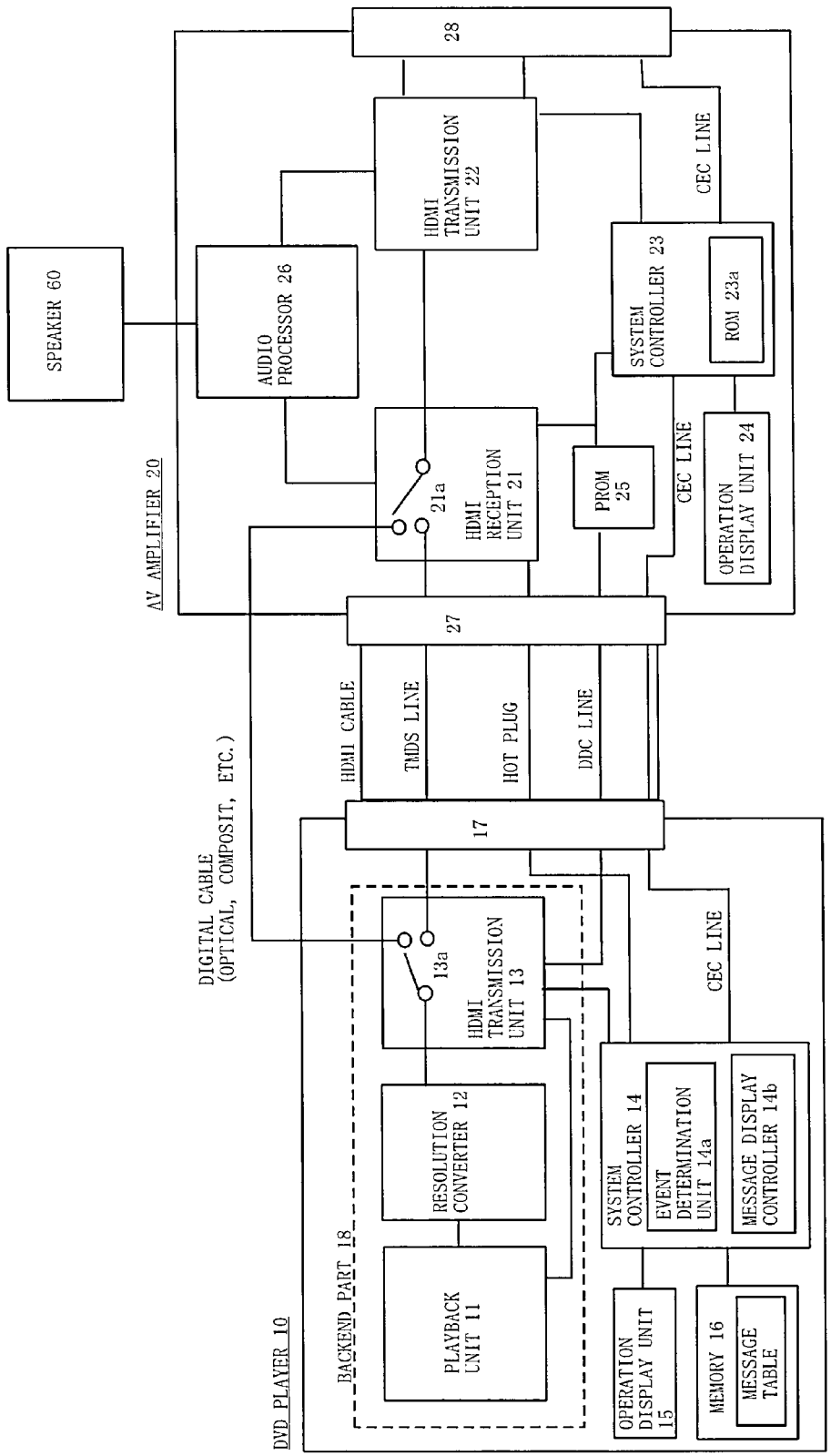
FIG. 1 is a block diagram showing the configuration of a DVD player 10 and an AV amplifier 20 according to a preferred embodiment of the present invention.

FIG. 1 is a schematic block diagram showing the configuration of a DVD player 10 and an AV amplifier 20. The DVD player 10 and the AV amplifier 20 conform to the HDMI (High Definition Multimedia Interface) standard, and are connected via an HDMI cable. Further, the DVD player 10 and the AV amplifier 20 are connected via digital cables (optical, composite, coaxial, component, etc.) besides the HDMI cable.

[Configuration of DVD Player 10]

The DVD player 10 will be described. The DVD player 10 includes a playback unit 11, a resolution converter 12, an HDMI transmission unit 13, a system controller 14, an operation display unit 15, a memory 16, and a connector unit 17. The playback unit 11, the resolution converter 12 and the HDMI transmission unit 13 constitute a backend part 18.

The playback unit 11 reads video data written on a DVD disc (hereinafter simply referred to as a disc) from the disc, decodes it, and supplies it to the resolution converter 12. Further, the playback unit 11 reads audio data written on the disc from the disc, decodes it, and supplies it to the HDMI transmission unit 13. The playback unit 11 includes an optical pickup, a servo circuit and a MPEG decoder.

The resolution converter 12 judges the resolution of the video data supplied from the playback unit 11. Further, the resolution converter 12 converts the judged resolution of the video data to the resolution set by a user, with a command from the system controller 14. The video data in which the resolution is converted by the resolution converter 12 is supplied to the HDMI transmission unit 13.

The HDMI transmission unit 13 converts the video data supplied from the resolution converter 12 and the audio data supplied from the playback unit 11 to data conforming to the HDMI standard (hereinafter referred to as HDMI data), with a command from the system controller 14. The HDMI transmission unit 13 transmits the converted HDMI data to the AV amplifier 20 via the connector unit 17.

The HDMI transmission unit 13 is connected to an HDMI receiving unit 21 of the AV amplifier 20 via a TMDS line (although there are multiple lines, only one line is shown for simplification) for transmitting/receiving the HDMI data and a hot plug for determining presence/absence of connection.

The HDMI transmission unit 13 includes a selection unit 13a which selects whether to transmit video data and audio data to the AV amplifier 20 via an HDMI cable (TMDS line), or to transmit them to the AV amplifier 20 via a digital cable. The selection unit 13a is capable of switching according to an instruction from the system controller 14, based on the setting operation by a user. Note that the selection unit 13a and the data line are shown to be shared in audio and video for simplification.

The system controller 14 controls the playback unit 11, the resolution converter 12, the HDMI transmission unit 13, the operation display unit 15, the memory 16 and the like. For example, it is a microcomputer. The system controller 14 carries out various kinds of processing based on operation input from the operation display unit 15 or control signals and data from respective units.

The system controller 14 is connected to a system controller 23 of the AV amplifier 20 via a CEC line, and transmits/receives commands and/or data to/from the system controller 23. The system controller 14 is connected to a PROM 25 of the AV amplifier 20 via the HDMI transmission unit 13 and a DCC line, reads out EDID stored on the PROM 25, and reads out the type of resolution.

The system controller 14 displays a setup menu for carrying out user settings, on the operation display unit 15. The setup menu includes a resolution setting screen for setting the resolution of video data to be outputted with an operation of a user, and a selection screen of the selection unit 13a.

In the memory 16 (e.g., ROM), resolution types which can be outputted by the DVD player 10 to the AV amplifier 20 are stored in advance.

The system controller 14 reads out the resolution type stored on the PROM 25 of the AV amplifier 20 via the DDC line, and compares it with the resolution types previously stored on the memory 16. The system controller 14 displays the resolution type which agrees with the resolution type included in the EDID read out from the PROM 25 of the AV amplifier 20 among the resolution types previously stored on the memory 16, on the resolution selection screen.

The memory 16 also stores a message table shown in FIG. 2. In the message table, massage IDs and message contents to be displayed on the operation display unit 15, associated with respective events, are stored in advance.

The system controller 14 includes an event determination unit 14a and a message display controller 14b. The event determination unit 14a sequentially determines, for a plurality of events with priorities, whether the current state of the DVD player 11 or the AV amplifier 20 corresponds to each of the events, starting from the event with the highest priority. When the event determination unit 14a founds the corresponding event, it ends the processing to determine whether each event corresponds or not. Then, when the event determination unit 14a founds the corresponding event, the message display controller 14b reads out a message previously associated with the event (at least one of message ID and message itself) from the message table of FIG. 2, and causes the operation display unit 15 to display it.

When a user has a question about the operation of the DVD player 10 or the AV amplifier 20, the user presses the message display button (help button) provided on the operation display unit 15. When the message display button is pressed, the event determination unit 14a automatically finds an event corresponding to the current state, and the message display controller 14b causes the operation display unit 15 to display a message. Therefore, the user can set the DVD player 10 or the AV amplifier 20 with reference to the message displayed on the operation display unit 15.

In this case, an event means a phenomenon, a state or a condition caused in the DVD player 10 or in the AV amplifier 20. For example, connecting states, various setting states (resolution settings, etc.), transmission/reception states of various data, and formats of various data are included. In other words, an event means each determination processing item in the flowchart described later.

Respective events are prioritized, and whether each of the events corresponds or not is determined sequentially, starting from the event of the highest priority. The reason for setting the priority is as follows. That is, the number of events corresponding to the current state of the DVD player 10 or the AV amplifier 20 is not always one but may be plural. Among them, some have no relationship with the problem, so there is a case that the problem cannot be solved even if the user carries out the message contents only associated with such events. In other words, if the event determination unit 14a determines whether the current state corresponds to each event at random and only displays a message for the corresponding event, the problem cannot be solved. In view of the above, by setting higher priority to an event which may have higher possibility of solving the problem, that is, which may have higher relationship, and by determining the event earlier, it is possible to display a more preferable message so as to enable the user to set accurate setting promptly.

Figure 3:
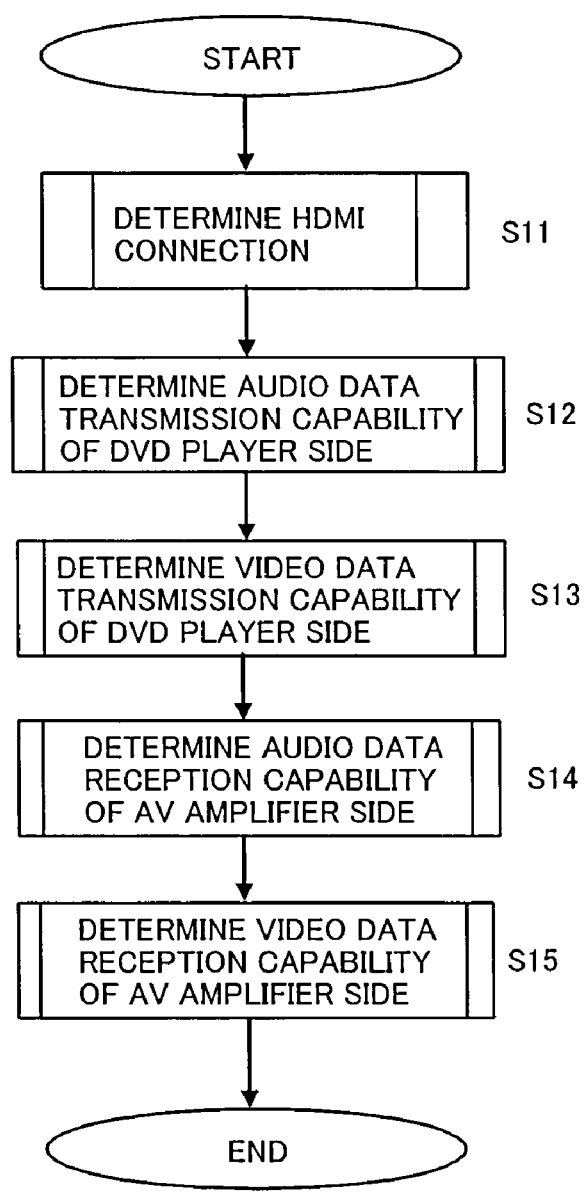
FIG. 3 shows the overview of an operation of a DVD player.

A method of determining the priority is as follows. As shown in FIG. 3, events relating to connection between the DVD player 10 and the AV amplifier 20, activation and authentication (S11) are set to have the highest priority. Events relating to connection, activation and authentication include connection errors, activation errors, authentication errors and wrong HDMI setting (on/off of HDMI output). Events relating to connection, activation, authentication and wrong HDMI setting are the most basic problems, so the DVD player 10 and the AV amplifier 20 cannot operate unless these problems have been solved. Therefore, these problems have the highest priority. Note that if a problem corresponds to an event relating to connection between the DVD player 10 and the AV amplifier 20, activation, authentication or HDMI setting, the message display controller 14b displays a message relating to an error in the connection or authentication or relating to wrong HDMI setting.

Events (S12, S13) relating to the DVD player 10 side are set to have higher priority than events (S14, S15) relating to the AV amplifier 20 side. Events relating to the DVD side are those relating to the current status of DVD (type, resolution, etc. of video data and/or audio data being outputted). In the case that the current state corresponds to an event of the DVD player 10 side, the message display controller 14b displays a message urging the user to change the settings of the DVD player 10 based on the status of the DVD player 10. Events relating to the AV amplifier 20 side are settings and the like of the AV amplifier 20 side, presumed based on the current status of the DVD (type, resolution, etc. of video data and/or audio data being outputted). That is, in this embodiment, the event of the AV amplifier 20 is not judged directly, but is presumed indirectly based on the status of the DVD player 10 side. In the case that the current state corresponds to an event of the AV amplifier 20 side, the message display controller 14b causes to display a message urging the user to change the settings of the AV amplifier 20 based on the status of the DVD player 10.

The reason why the priorities of events relating to the DVD player 10 side are higher is that events are determined by the event determination unit 14a in the DVD player 10. For events relating to the DVD player 10 side, the causes can be determined more directly. Accordingly, by determining events relating to the DVD player side earlier, it is highly likely that a more preferable message is displayed so that the problem can be solved immediately.

Further, an event relating to audio data transmission (S12) is set to have higher priority than an event relating to video data transmission (S13). This is because there are many user setting items for audio data transmission, and they are difficult, so it is highly likely to cause wrong settings. Further, settings for video data transmission include resolution settings, and setting to a prescribed resolution is provided as an event. However, if the priority of this event is set higher, in the case where the user has set a prescribed resolution, a message urging to change the resolution is displayed when the user presses the message display button even though no problem is caused in the resolution setting.

Due to the reasons described above, events relating to the AV amplifier 20 side (S14, 15) are set to have the lowest priority. Further, due to the reasons described above, an event relating to the audio data transmission (S14) is set to have higher priority than an event relating to the video data transmission (S15).

Further, since the priority is determined as described above, various kinds of messages can be displayed on the operation display unit 15. That is, if an event of the AV amplifier 20 side is determined in priority so as to display a message associated with the event, the user has to change the setting of the AV amplifier 20, and a problem on the DVD player 10 side will not be displayed, so the user cannot change the setting of the DVD player 10. Even when the setting of the AV amplifier 20 is changed, audio data or video data itself outputted from the DVD player 10 will not be changed, so even if the user inputs an instruction to display a message, a message for an event relating to the AV amplifier 20 will be displayed again. In this embodiment, an event on the DVD player 10 side is determined first and a message associated with the event is displayed. Thereby, the user can change the setting of the DVD Player 10 first. In this case, if a problem in the audio data or the video data outputted from the DVD player 10 is solved, a message relating to an event of the AV amplifier 20 side can be displayed subsequently. The relationship between video and audio is the same. If the priority of video is set higher, only a message relating to resolution will be displayed unless the resolution setting is changed, but if the priority of audio is set higher, a message relating to audio setting is displayed first, and when the problem in the audio setting is solved, a message relating to the resolution can be displayed subsequently.

Next, the configuration of the AV amplifier 20 will be described. The AV amplifier 20 includes an HDMI receiving unit 21, an HDMI transmission unit 22, a system controller 23, an operation display unit 24, a memory (EDID PROM, hereinafter referred to as PROM) 25, audio processor 26, and connector units 27 and 28.

The HDMI receiving unit 21 receives HDMI data transmitted from the DVD player 10, generates the original video data (video data before HDMI conversion) from the received HDMI data, and supplies it to the HDMI transmission unit 22. Further, the HDMI receiving unit 21 generates the original audio data from the received HDMI data, and supplies it to the audio processor 26.

Further, the HDMI receiving unit 21 includes a selection unit 21a which selects a piece of video data and a piece of audio data among video data and audio data received through an HDMI cable and video data and audio data received through a digital cable.

The HDMI transmission unit 22 converts video data supplied from the HDMI receiving unit 21 and audio data supplied from the audio processor 26 as required to HDMI data, and transmits them to a display device (not shown) via the connector unit 28. The HDMI transmission unit 22 is connected to an HDMI receiving unit of the display device via a TMDS line and a hot plug.

The audio processor 26 performs processing such as signal processing, amplification processing and D/A conversion to the audio data supplied from the HDMI receiving unit 21, and supplies an audio signal to the speaker 60 connected outside. Further, the audio processor 26 supplies the audio data to the HDMI transmission unit 22 as required.

The system controller 23 controls the HDMI receiving unit 21, the HDMI transmission unit 22, the operation display unit 24, the PROM 25, the audio processor 26 and the like. The system controller 23 is a microcomputer for example. The system controller 23 performs various processing based on operation inputs from the operation display unit 24 or control signals and data from respective units.

The system controller 23 incorporates (or is connected to) a memory 23a such as ROM. The ROM 23a stores types of resolution outputted from the AV amplifier 20 in advance.

Generally, the ROM 23a stores multiple types of resolution corresponding to the HDMI standard.

The PROM 25 is connected to the system controller 14 of the DVD player 10 via a DDC line and the HDMI transmission unit 13. In the PROM 25, EDID including types of resolution is registered by the system controller 23, and the registered EDID is read out by the system controller 14 of the DVD player 10 via the DDC line and the HDMI transmission unit 13.

For the system having the above-described configuration, the operation and action thereof will be described with reference to FIGS. 3 to 8.

[Operation Overview]

FIG. 3 is a flowchart showing the processing overview performed by the DVD player 10. For example, if a user presses the message display button of the operation display unit 15 since audio is not played from the speaker 60 or video is not displayed on the display device, the system controller 14 performs (1) HDMI connection determination processing (S11), (2) audio data transmission capability determination processing of the DVD player 10 side (S12), (3) video data transmission capability determination processing of the DVD player 10 side (S13), (4) audio data reception capability determination processing of the AV amplifier 20 side (S14), and (5) video data reception capability determination processing of the AV amplifier 20 side (S15), in the preference order. When the system controller 14 determines to correspond to an event, the system controller 14 displays a massage or a message ID associated with the event on the operation display unit 15, and ends the determination processing of the event. Each kind of processing will be described below in detail.

[HDMI Connection Determination Processing]

Figure 4:
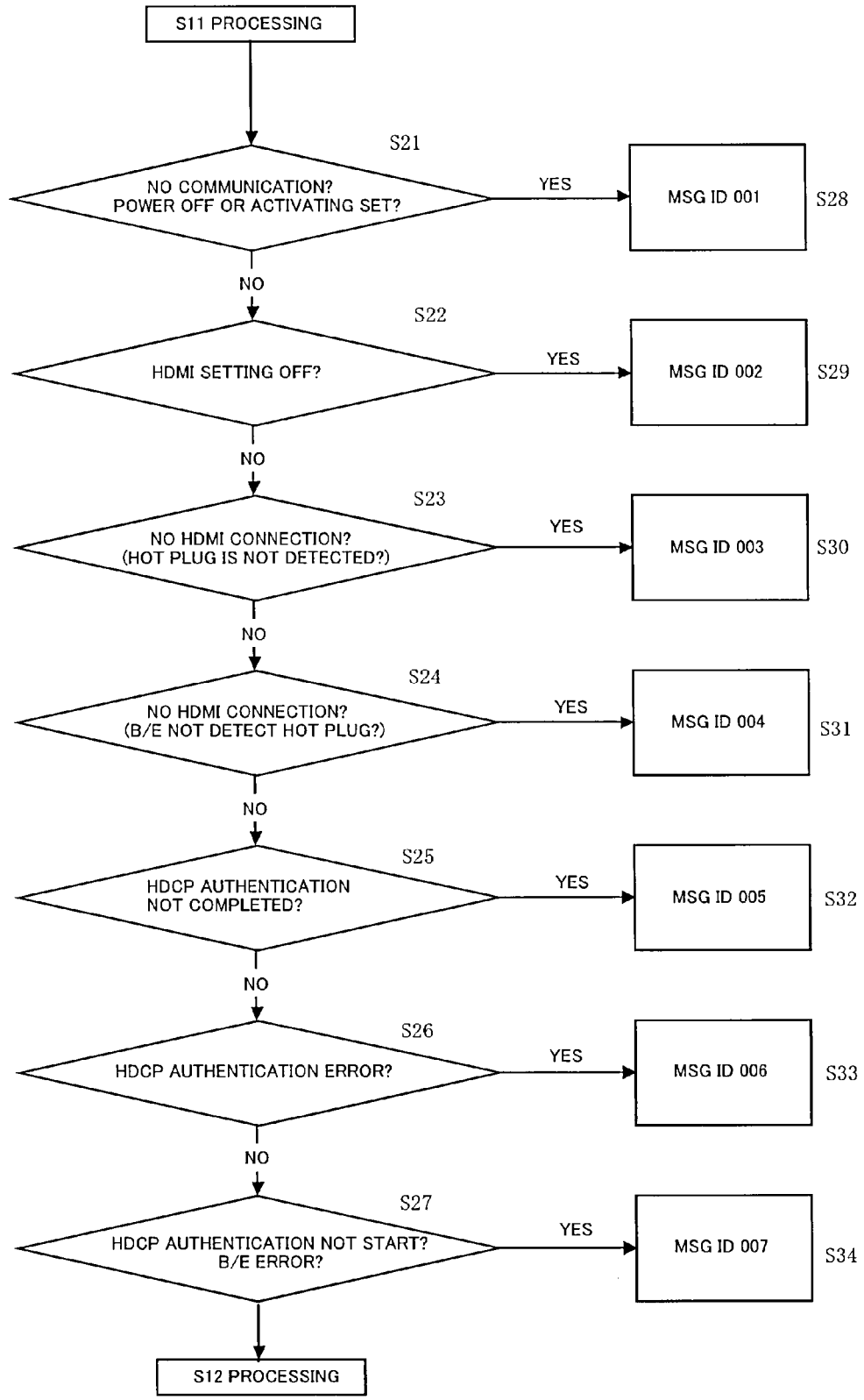
FIG. 4 is a flowchart showing HDMI connection determination processing.

FIG. 4 is a flowchart showing the HDMI connection determination processing of S11. The HDMI connection determination processing has the highest priority. When the message display button is pressed, the respective events (S21 to S27) are determined first. First, the system controller 14 determines whether the current state corresponds to a basic event that the power of the DVD player 10 is turned off or communications between the backend part 18 and the system controller 14 are impossible (S21). If the power of the DVD player 10 is turned off or communications between the backend part 18 and the system controller 14 are impossible (S21: YES), it is determined that audio is not outputted from the speaker 60 since the power is turned off or communications between the system controller 14 and the backend part 18 are impossible, so the system controller 14 displays a message "Setting operation trouble may be caused. Please restart", the message ID of which is 001, on the display operation unit 15 (S28).

Next, if the power of the DVD player 11 is turned on and communications between the backend part 18 and the system controller 14 are possible (S21: NO), the system controller 14 determines whether the current state corresponds to an event that the HDMI setting is OFF (S22). The HDMI setting is on/off setting of HDMI output. Namely, it is setting whether the DVD player 10 outputs audio data and video data through an HDMI cable. If the HDMI setting is OFF (S22: YES), it is determined that audio is not outputted from the speaker 60 since the HDMI setting is OFF. Therefore, the system controller 14 displays a message "Please set HDMI output to ON", the message ID of which is 002, on the operation display unit 15 (S29).

If the HDMI setting is ON (S22: NO), the system controller 14 determines whether the current state corresponds to an event that the DVD player 11 is not HDMI-connected to the AV amplifier 20 (that is, the system controller 14 does not detect a hot plug signal) (S23). If the system controller 14 does not detect a hot plug signal (S23: YES), it is determined that HDMI connection must be checked, so the system controller 14 displays a message "Please connect the cable correctly, and turn the power of the connected HDMI equipment ON", the message ID of which is 003, on the operation display unit 15 (S30).

Next, the system controller 14 determines whether the current state corresponds to an event that the DVD player 11 is not HDMI-connected to the AV amplifier 20 (that is, the backend part 18 does not detect a hot plug signal) (S24). Information whether the backend part 18 detects a hot plug signal is notified from the backend part 18 to the system controller 14. If the backend part 18 does not detect a hot plug signal (S24: YES), it is determined that HDMI connection must be checked, so the system controller 14 displays a message "Setting operation trouble is caused (Hot plug is not recognized)", the message ID of which is 004, on the operation display unit 15 (S31).

If the backend part 18 detects a hot plug signal (S24: NO), it is determined that no problem is caused in the HDMI connection, so the system controller 14 determines whether the current state corresponds to an event that HDCP authentication is not completed (S25). If the HDCP authentication is not completed (S25: YES), it is determined that authentication is currently underway, or determined that an AV amplifier or a display device which does not support HDCP, that is, which conforms to the DVI standard for example, is connected. Therefore, the system controller 14 displays a message "HDCP authentication is now underway. Please wait", the message ID of which is 005, on the operation display unit 15 (S32).

If the HDCP authentication is completed (S25: NO), the system controller 14 determines whether the current state corresponds to an event that an error is caused in the HDCP authentication (S26). If an error is caused in the HDCP authentication (S26: YES), it is determined that an AV amplifier or a display device not supporting HDCP, that is, conforming to the DVI standard for example, is connected. Therefore, the system controller 14 displays a message "HDCP authentication is failed. Please check if the connected equipment does not support HDCP", the message ID of which is 006, on the operation display unit 15 (S33).

If no error is caused in the HDCP authentication (S26: NO), the system controller 14 determines whether the current state corresponds to an event that HDCP authentication does not start or an event that an authentication error is caused on the backend part 18 side (S27). If HDCP authentication does not start or an authentication error is caused on the backend part 18 side (S27: YES), the system controller 14 displays a message "Setting operation trouble is caused. (Authentication does not start)", the message ID of which is 007, on the operation display unit 15 (S34). On the other hand, if HDCP authentication has started and no authentication error is caused on the backend part 18 side (S27: NO), the system controller 14 ends the HDMI connection determination processing having the highest priority, and then proceeds to audio data transmission capability processing on the DVD player 10 side (S12).

[Audio Data Transmission Capability Determination Processing on the DVD Player Side]

Figure 5A:
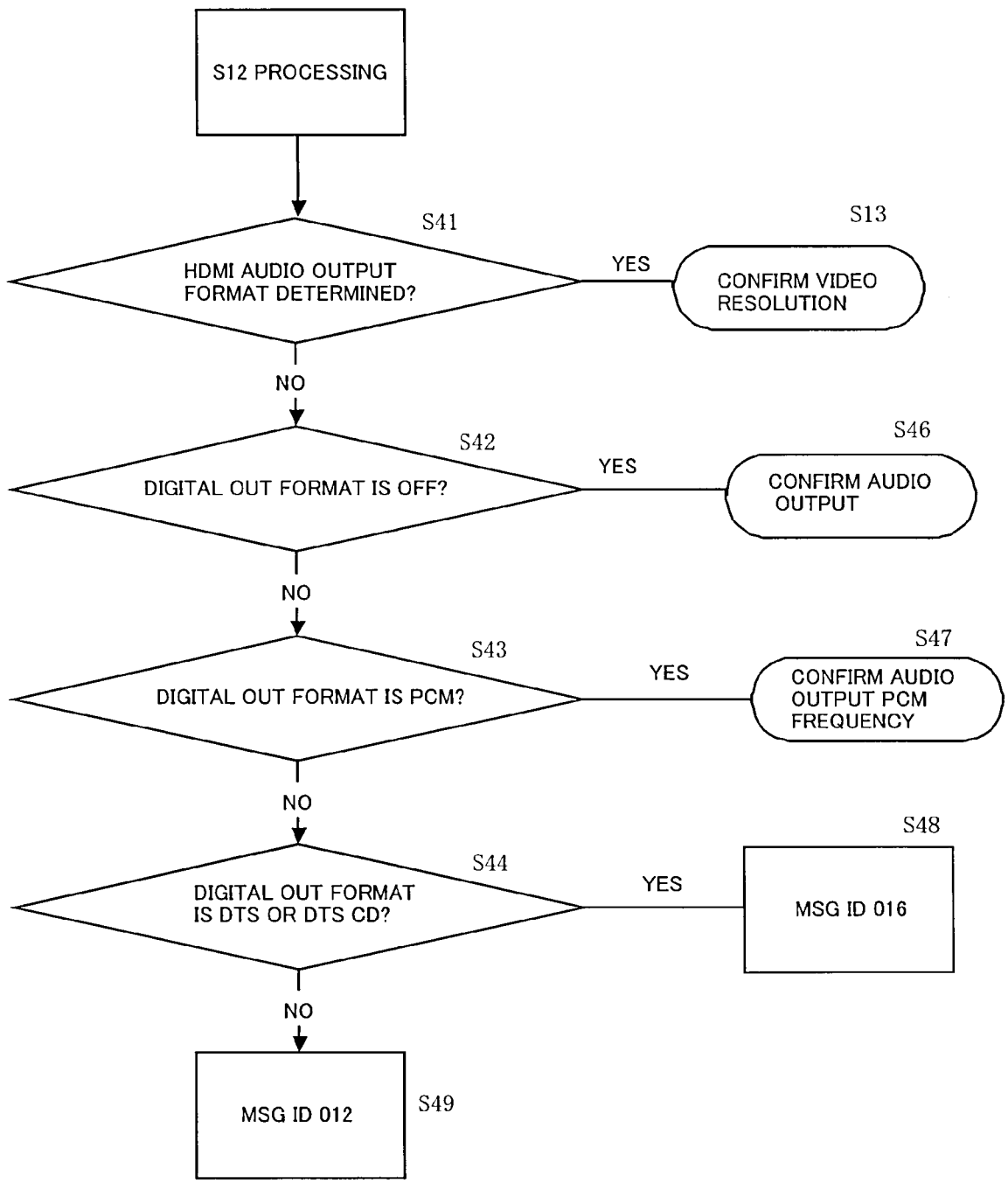
FIG. 5A is a flowchart showing audio data transmission capability determination processing on the DVD player side.

FIG. 5A is a flowchart showing audio data transmission capability determination processing on the DVD player side of S12. The audio data transmission capability determination processing on the DVD player side has the second highest priority. If there is no problem in all events of the HDMI connection determination processing (S11), respective events of this processing are determined. Note that respective events in FIG. 5A are events relating to audio data transmitted from the HDMI transmission unit 13.

First, the system controller 14 determines whether the current state corresponds to an event that the HDMI audio output format is determined (S41). This even t is an event that output of HDMI data (audio data) from the HDMI transmission unit 13 to the TMDS line of the HDMI cable is realized. If the audio data is outputted to the TMDS line (S41: YES), output of audio data through the HDMI cable is realized, so it is determined that no problem is caused in the event of S12. Therefore, the system controller 14 proceeds to video data transmission capability determination processing on the DVD player side of S13 (detail will be described later in FIG. 6).

If the audio data is not outputted to the TMDS line (S41: NO), the system controller 14 determines whether the current state corresponds to an event that there is no digital audio output from the HDMI transmission unit 13 (digital audio output from digital cable) (S42). If there is no digital audio output from the HDMI transmission unit 13 (S42: YES), it is estimated that the HDMI transmission unit 13 does not output audio data and that the audio data itself played by the playback unit 11 involves a problem, so the system controller proceeds to audio output determination processing (S46, detail will be described later in FIG. 5B).

If there is a digital audio output from the HDMI transmission unit 13 (S42: NO), digital audio data is outputted through a digital cable, so the system controller 14 determines whether the current state corresponds to an event that the format of the digital audio data is PCM (or LPCM, the same applies below) (S43). If the format of the digital audio data is PCM (S43: YES), the AV amplifier 20 must be able to support it, but the AV amplifier 20 side may not support the sampling frequency of the PCM audio data. Accordingly, the system controller 14 performs PCM frequency confirmation processing (S47, detail will be described later in FIG. 5C).

If the format of the digital audio data is not PCM (S43: NO), the system controller 14 determines whether the current state corresponds to an event that the format is DTS (or DTSCD, the same applies below) (S44). If the format is DTS (S44: YES), the AV amplifier 20 may not support DTS, so the system controller 14 displays a message "HDMI connecting device does not support DTS, so DTS audio cannot be outputted", the message ID of which is 016, on the operation display unit 15 (S48). On the other hand, if the format is not DTS (S44: NO), the format is Dolby Digital or the like, so the AV amplifier 20 may not support Dolby Digital. Therefore, the system controller 14 displays a message "Connected equipment does not support bit stream audio (Dolby Digital, etc.), so audio cannot be outputted. Please change HDMI output setting to PCM output", the message ID of which is 012, on the operation display unit 15 (S49).

Figure 5B:
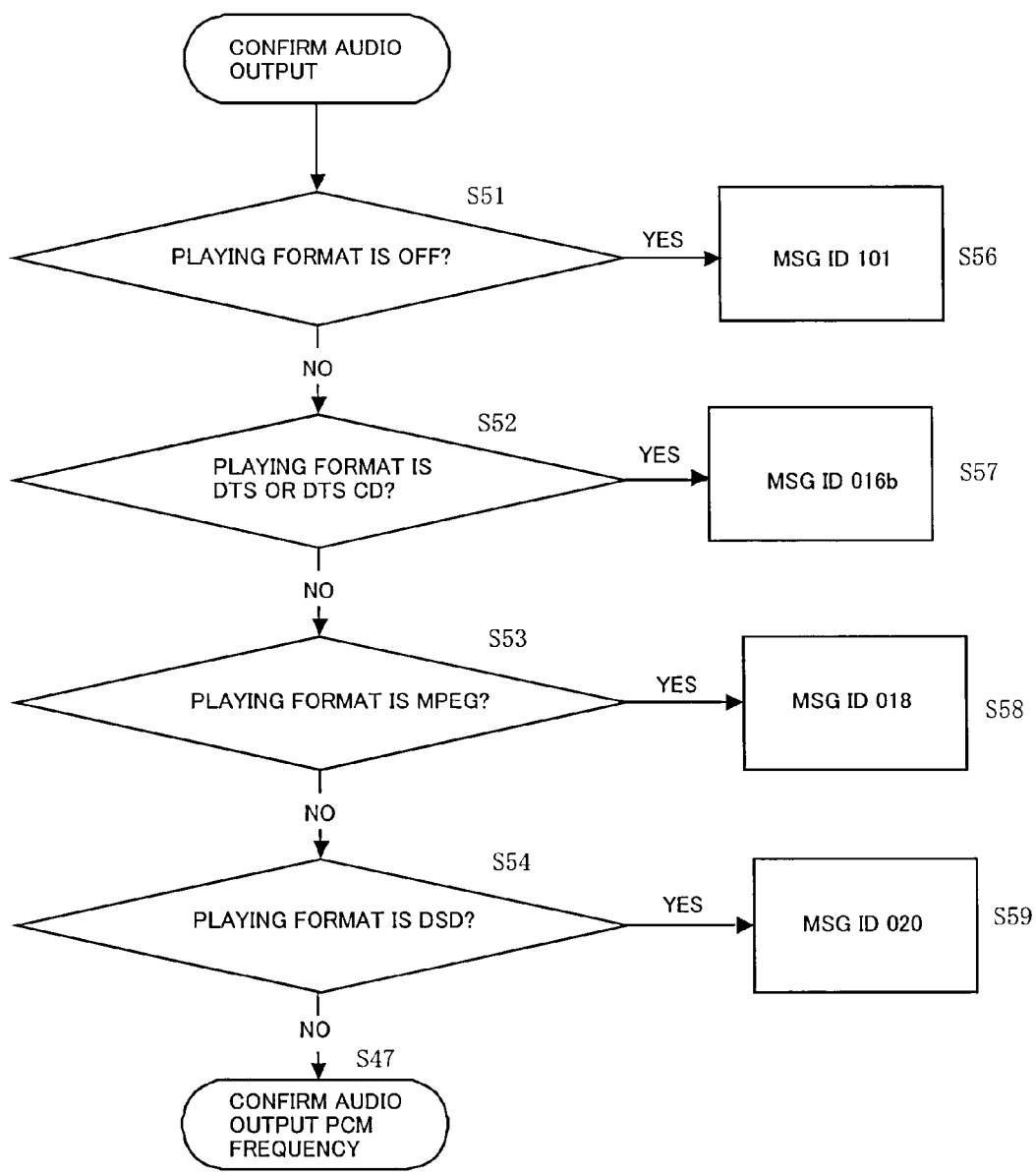
FIG. 5B is a flowchart showing audio output confirmation processing from a playback unit 11.

The audio output confirmation processing of S46 will be described with reference to FIG. 5B. Each event in FIG. 5B is an event relating to audio data to be played by the playback unit 11. First, the system controller 14 determines whether the current state corresponds to an event that the data played from the disc by the playback unit 11 does not include audio data (S51). For example, if the data being played does not include audio data since the playback unit 11 is playing the menu screen of the DVD or the like (S51: YES), the system controller 14 displays a message "Please confirm the disc being played contains audio correctly", the message ID of which is 101, on the operation display unit 15 (S56).

If the data being played includes audio data (S51: NO), the system controller 14 determines whether the format of the audio data being played is DTS (S52). If the HDMI audio output setting is set to PCM, the playback unit 11 is adapted not to output audio data unless the audio data being played is PCM. Accordingly, the system controller 14 displays a message "Please set HDMI audio output setting of this equipment to ALL", the message ID of which is 016b, on the operation display unit 15 (S57). With the ALL setting, the playback unit 11 outputs audio data of any format.

If the format of the audio data being played is not DTS (S52: NO), the system controller 14 determines whether the current state corresponds to an event that the format of the audio data being played is MPEG data (MPEG1, MPEG2 or MPEGEX, the same applies below) (S53). If the HDMI audio output setting is set to PCM, the playback unit 11 is adapted not to output audio data unless the audio data being played is PCM. Accordingly, the system controller 14 displays a message "Please set HDMI audio output setting of this equipment to ALL", the message ID of which is 018, on the operation display unit 15 (S58).

If the audio data being played is not MPEG data (S53: NO), the system controller 14 determines whether the current state corresponds to an event that the format of the audio data being played is DSD (S54). If the HDMI audio output setting is set to PCM, the playback unit 11 is adapted not to output audio data unless the audio data being played is PCM. Accordingly, the system controller 14 displays a message "SACD audio cannot be HDMI outputted", the message ID of which is 020, on the operation display unit 15 (S59).

If the audio data being played is not DSD (S54: NO), the format is PCM, so the frequency of the PCM audio data may involve a problem. Therefore, the system controller 14 performs PCM frequency confirmation processing (S47).

Figure 5C:
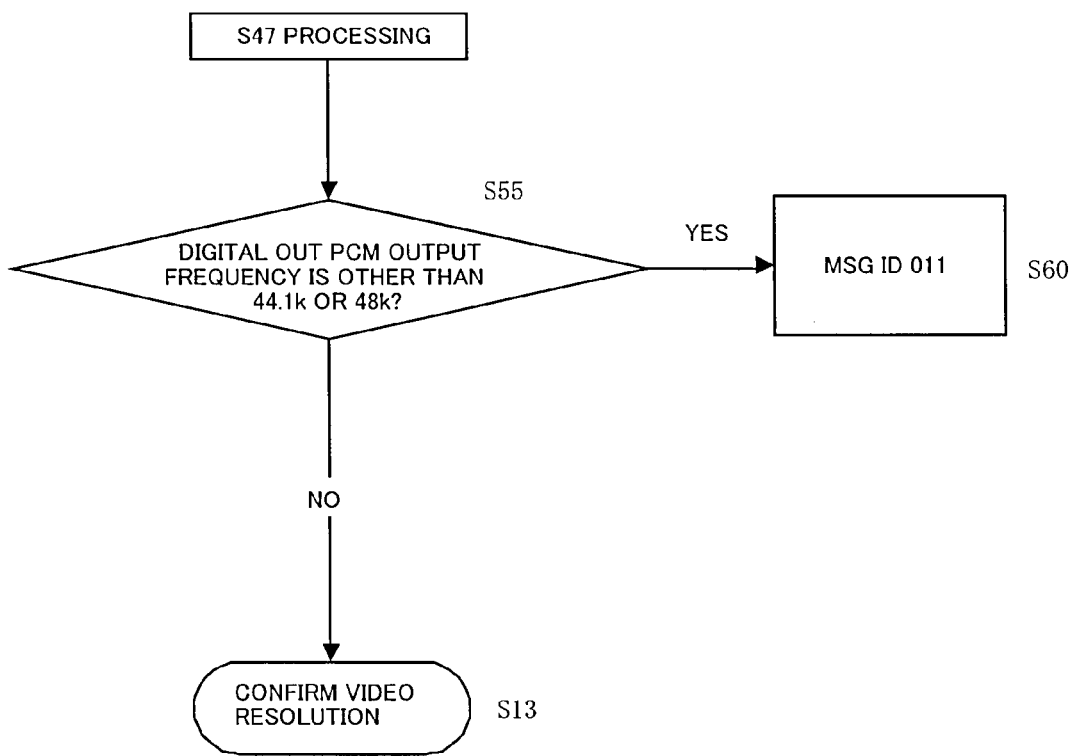
FIG. 5C is a flowchart showing PCM frequency confirmation processing.

The PCM frequency confirmation processing of S47 will be described with reference to FIG. 5C. The system controller 14 determines whether the current state corresponds to an event that the sampling frequency of the PCM audio data is not a prescribed frequency (e.g., 44.1 kHz or 48 kHz) (S55). If the sampling frequency of the PCM audio data is not 44.1 kHz or 48 kHz (S55: YES), it is expected that the sampling frequency of the PCM audio data is 88.2 kHz or higher, and that the AV amplifier 20 does not support such a high sampling frequency. Therefore, the system controller 14 displays a message "lease set downsampling setting to ON", the message ID of which is 011, on the operation display unit 15 (S60). With downsampling, it is possible to change the frequency to one supported by the AV amplifier 20.

On the other hand, if the sampling frequency of the PCM audio data is 44.1 kHz or 48 kHz (S55: NO), it is determined that there is no problem in the events of S12, so the system controller 14 proceeds to video data transmission capability determination processing of the DVD player side of S13 (S13).

[Video Data Transmission Capability Determination Processing of DVD Player Side]

Figure 6:
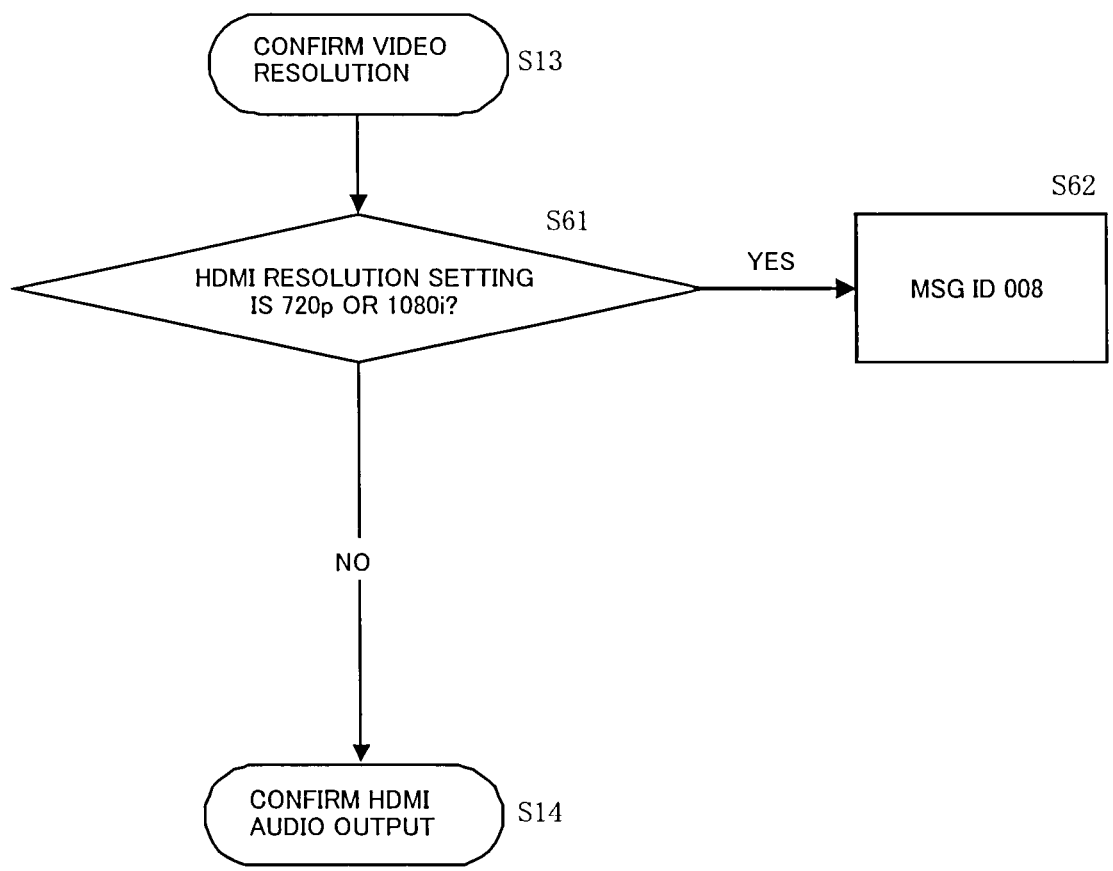
FIG. 6 is a flowchart showing video data transmission capability determination processing on the DVD player side.

FIG. 6 is a flowchart showing video data transmission capability determination processing of the DVD player side of S13. Video data transmission capability determination processing of the DVD player side has a third highest priority, and each event is determined after determining the respective events of the audio data transmission capability processing of the DVD player side.

The system controller 14 determines whether the current state corresponds to an event that the resolution set in the DVD player 10 is a prescribed resolution (e.g., 720P or 1080i) (S61). If the resolution is 720P or 1080i (S61: YES), it is estimated that the HDMI transmission unit 13 outputs the video data with a resolution which cannot be processed by the AV amplifier 20, so the resolution must be changed. Consequently, the system controller 14 displays a message "Please set HDMI setting to AUTO", the message ID of which is 008, on the operation display unit 15 (S62). When it is set to AUTO, a resolution which can be supported by the AV amplifier 20 is automatically set.

If the resolution set is not 720P or 1080i (S61: NO), it is expected that no problem is involved in the resolution setting. Consequently, it is determined that there is no problem in the events of S13, the system controller 14 proceeds to audio data reception capability determination processing of the AV amplifier 20 side of S14.

[Audio Data Reception Capability Determination Processing of AV Amplifier 20 Side]

Figure 7A:
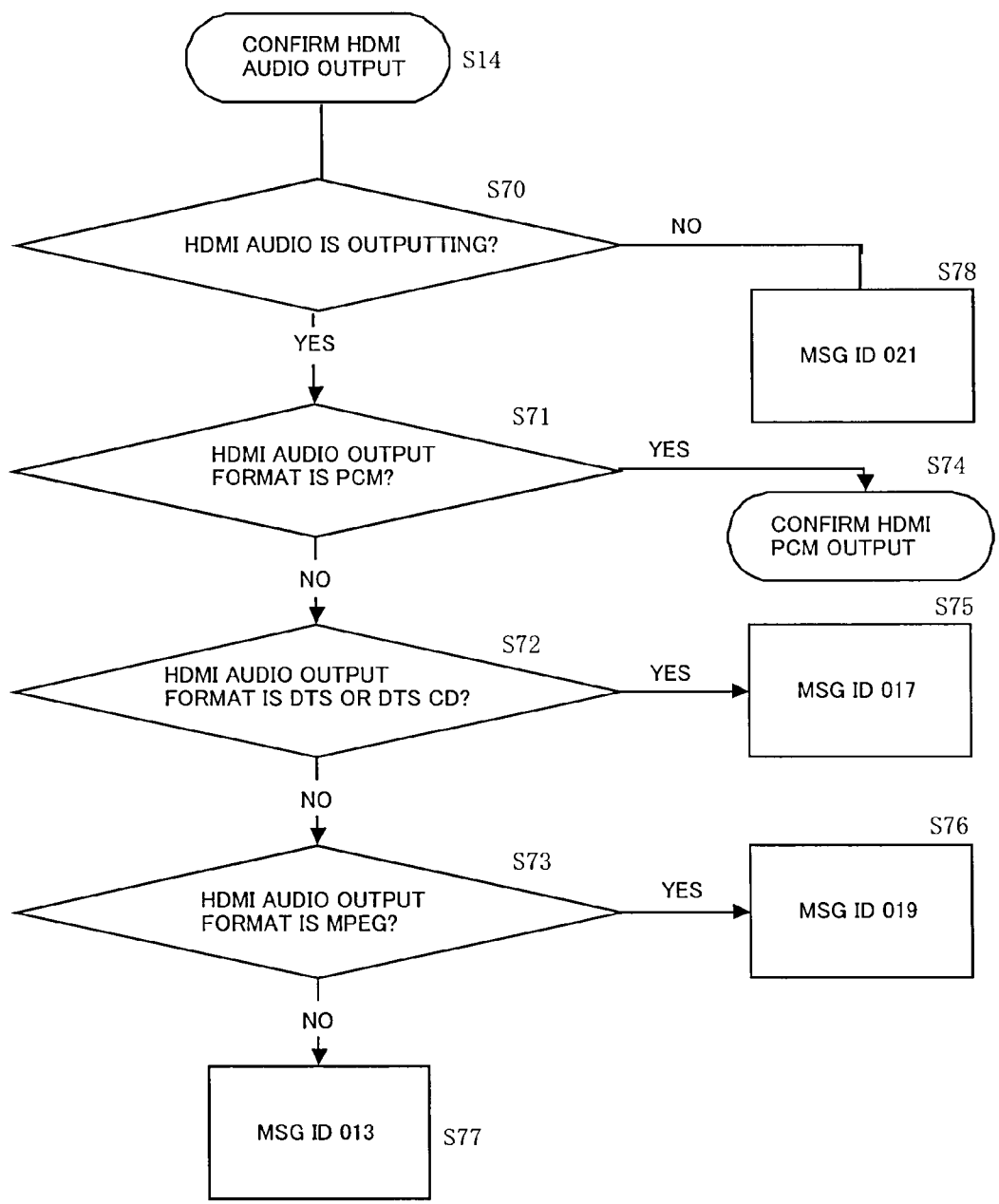
FIG. 7A is a flowchart showing audio data transmission type to the AV amplifier side and capability determination.
Figure 7B:
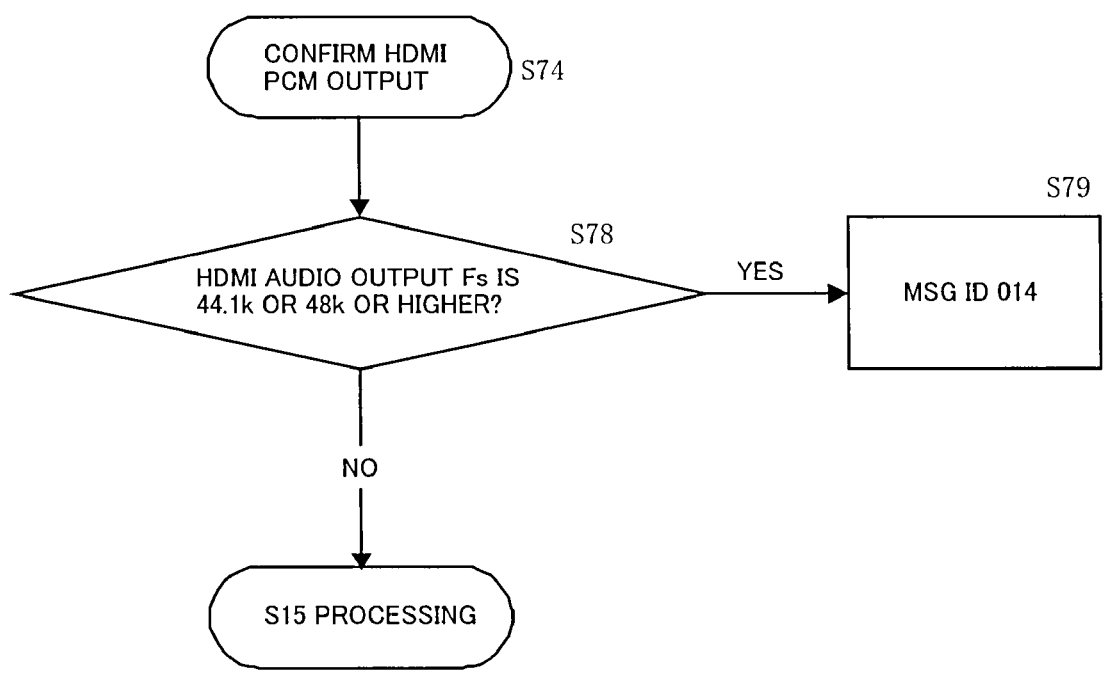
FIG. 7B is a flowchart showing PCM frequency confirmation processing of HDMI data.

FIGS. 7A and 7B are flowcharts showing audio data reception capability determination processing of the AV amplifier 20 side. This processing has the fourth highest priority. After it is determined that no problem is involved in the events of the DVD player 10 side in S12 and S13, respective events (S71 to S73) are determined. These events are to presume that a problem is involved in settings or the like of the AV amplifier 20 side based on events relating to HDMI data (audio data) transmitted from the HDMI transmission unit 13.

FIG. 7A shows processing to check audio data outputted from the HDMI transmission unit 13 via a TMDS line, and determine whether the connected AV amplifier 20 is capable of processing the audio data. First, the system controller 14 determines whether the HDMI transmission unit 13 is outputting HDMI audio data (S70). If it is not outputting HDMI audio data (S70: NO), the system controller 14 displays a message "Please check if HDMI audio output setting is ON. Does HDMI connecting equipment support Audio output?", the message ID of which is 021 (S78). If it is outputting HDMI audio data (S70: YES), the system controller 14 determines whether the current state corresponds to an event that the format of the audio data outputted through a TMDS line is PCM (S71). If the format of the audio data is PCM (S71: YES), the PCM audio data itself can be supported by the AV amplifier 20, so in this case, it is expected that the sampling frequency of the PCM audio data is not supported by the AV amplifier 20. Accordingly, the system controller 14 performs sampling frequency determination processing of the PCM data of HDMI (S74).

FIG. 7B shows the sampling frequency determination processing of PCM data of HDMI. The system controller 14 determines whether the current state corresponds to an event that the sampling frequency of the PCM data of HDMI is not lower than a prescribed value (e.g., 44.1 kHz or 48 kHz) (S78). If the sampling frequency is not lower than 44.1 kHz or 48 kHz (S78: YES), it is expected that the AV amplifier 20 does not support the frequency. Therefore, the system controller 14 displays a message "PCM audio of 48 kHz or higher is being outputted. Please check volume setting and input setting of the connected equipment. Please check if output is possible by setting downsampling to ON", the message ID of which is 014, on the operation display unit 15 (S79).

If the sampling frequency is less than 44.1 kHz or 48 kHz (S78: NO), there is no problem in reception capability of audio data on the AV amplifier side of S14. Therefore, the system controller 14 proceeds to video data reception capability determination processing on the AV amplifier side of S15 (to be described in detail in FIG. 8).

Turning back to FIG. 7A, if the format of the audio data is not PCM (S71: NO), the system controller 14 determines whether the current state corresponds to an even that the format of the audio data is DTS (S72). If the format of the audio data is DTS (S72: YES), it is expected that the AV amplifier 20 does not support DTS. Accordingly, the system controller 14 displays a message "Please check volume setting and input setting of the connected equipment. DTS audio is currently outputted", the message ID of which is 017, on the operation display unit 15 (S75).

If the format of the audio data is not DTS (S72: NO), the system controller 14 determines whether it corresponds to an event that the format of the audio data is MPEG data (S73). If the audio data is MPEG data (S73: YES), it is expected that the AV amplifier 20 does not support MPEG data. Accordingly, the system controller 14 displays a message "Please check volume setting and input setting of the connected equipment. MPEG audio is currently outputted", the message ID of which is 019, on the operation display unit 15 (S76).

If the format of the audio data is not MPEG data (S73: NO), the format of the audio data is Dolby Digital, and it is expected that the AV amplifier 20 does not support Dolby Digital. Accordingly, the system controller 14 displays a message "Please check volume setting and input setting of the connected equipment. Dolby Digital audio is currently outputted", the message ID of which is 013, on the operation display unit 15 (S77).

[Video Data Reception Capability Determination Processing on the AV Amplifier Side]

Figure 8:
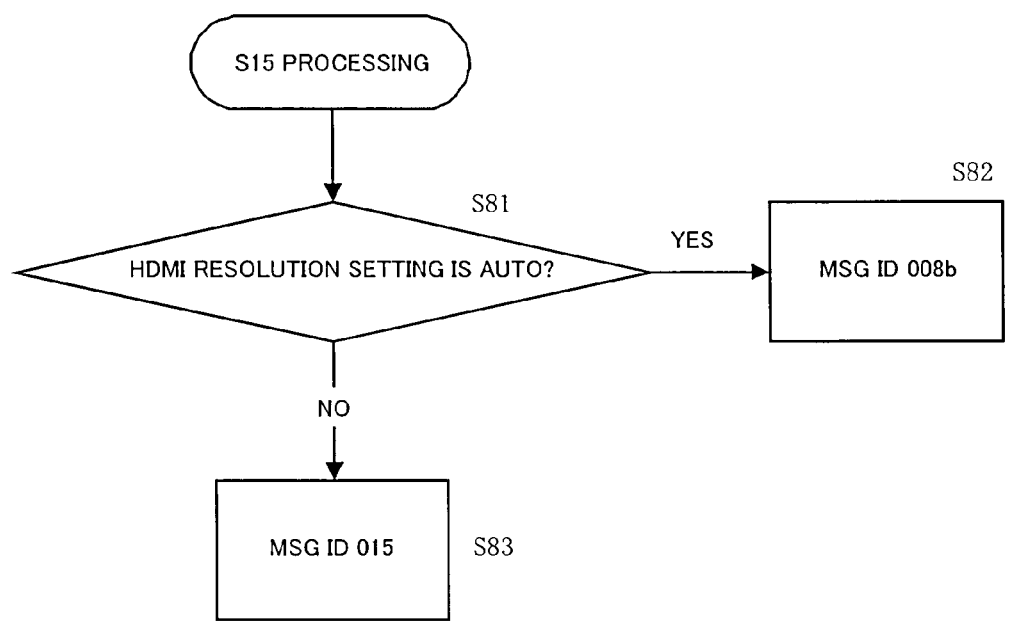
FIG. 8 is a flowchart showing video data transmission type to the AV amplifier side and capability determination.

FIG. 8 is a diagram showing video data reception capability determination processing on the AV amplifier side. This processing has the lowest priority, and respective events are determined when there is no problem in S11 to S14. These events are to presume that a problem is involved in the settings or the like on the AV amplifier 20 side, based on events relating to HDMI data (video data) transmitted from the HDMI transmission unit 13.

The system controller 14 determines whether the current state corresponds to an event that the resolution setting of the DVD player 10 is automatic (S81). The fact that the resolution setting is automatic means to automatically set a resolution which can be processed by the AV amplifier 20 based on the resolution included in EDID acquired from the PROM 25 of the AV amplifier 20. When the resolution setting is automatic (S81: YES), it is expected that the resolution registered in the PROM 25 of the AV amplifier 20 is wrong, that is, a resolution that the AV amplifier 20 cannot process is registered in the PROM 25, and the DVD player 10 automatically set the resolution. In this case, the problem can be solved by changing the resolution setting from automatic to 480p, for example. Accordingly, the system controller 14 displays a message "Output is currently performed with resolution receivable by the receiver. Please check video input setting of the connected HDMI equipment. Video is currently outputted with HDMI resolution being automatic. If there is any problem, please set to 480p", the message ID of which is 008b, on the operation display unit 15 (S82).

If the resolution setting is not automatic (S81: NO), there is no event to be checked any more. Therefore, the system controller 14 displays a message "If normal HDMI equipment is connected, there is no problem in the settings", the message ID of which is 015, on the operation display unit 15 (S83).

Through the above processing, when the message display button is pressed by the user, the system controller 14 can automatically find the corresponding event and display the best message on the operation display unit 15.

Figure 9:
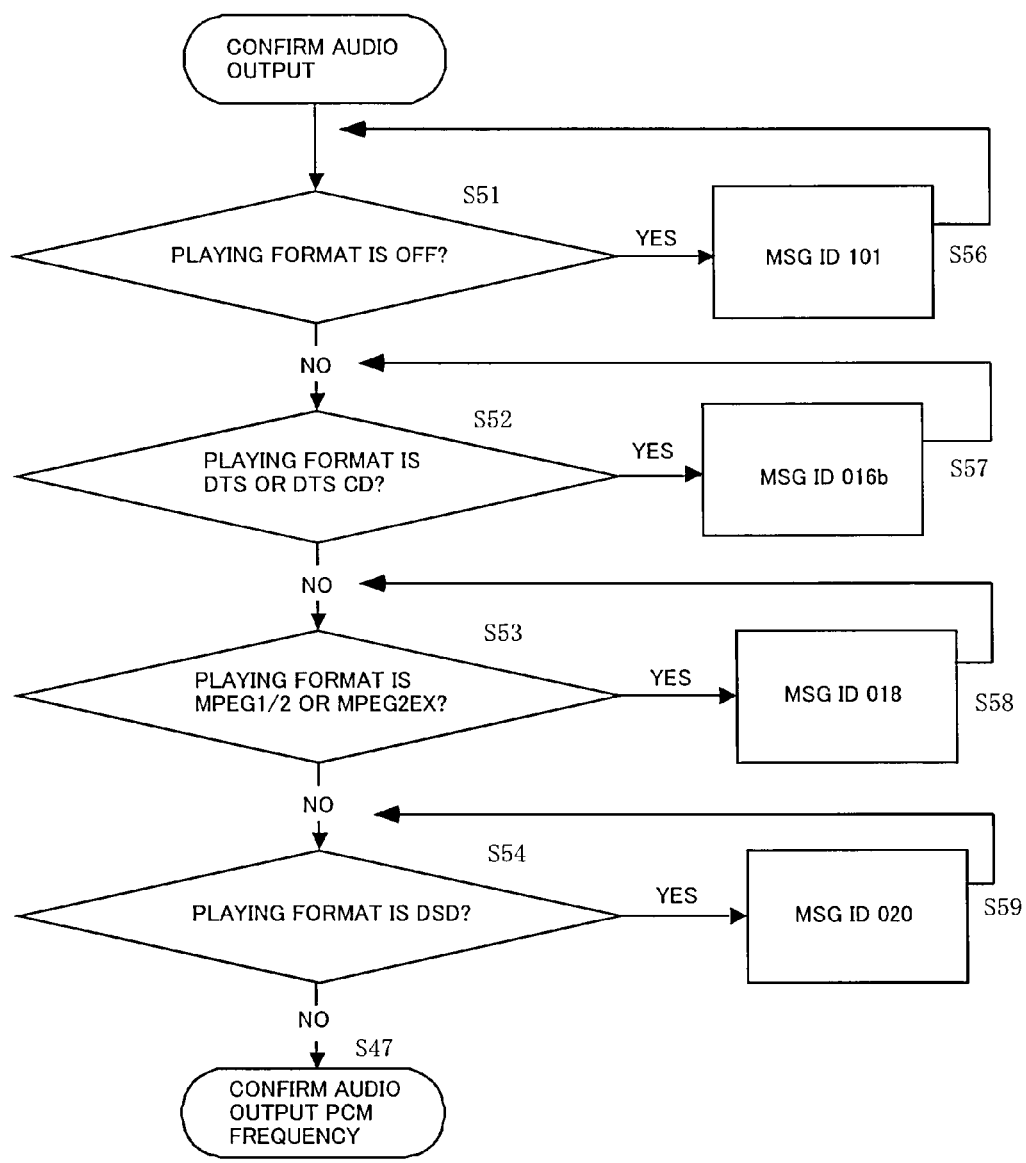
FIG. 9 is a flowchart showing another embodiment.

Next, another embodiment of the present invention will be described. In this embodiment, during the time that the system controller 14 finds the corresponding event and displays a message on the operation display unit 15, if the user performs setting operation so that the event does not correspond any more, the system controller 14 continues determination processing for the next corresponding event. For example, as shown in FIG. 9, (FIG. 9 is a variation of Fig. SB), the system controller 14 checks whether the same event dose not correspond any more while displaying a message corresponding to the event found, and when it becomes not to correspond, checks the next event. Thereby, the user can carry out setting while reading messages until all events do not correspond any more. This also applies to other events.

[Audio Data Reception Capability Determination Processing on the AV Amplifier Side Using EDID of AV Amplifier]

Figure 10:
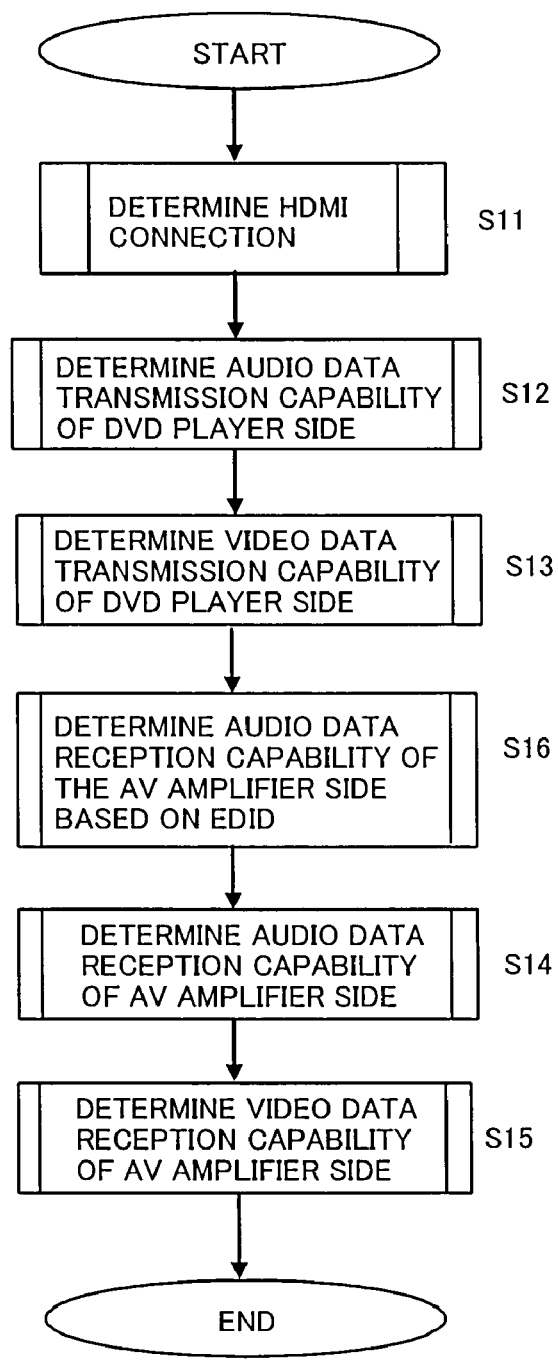
FIG. 10 shows the overview of another operation of the DVD player.

Next, still another embodiment of the present invention will be described. In this embodiment, the system controller 14 reads out EDID (corresponds to the setting information) stored on the PROM 25 of the AV amplifier 20, and performs "audio data reception capability determination processing on the AV amplifier side based on EDID", based on the contents included in the EDID and the setting state and the status of the current DVD player 14, between the processing of S13 and the processing of S14, as shown in FIG. 10 (S16). In S14, it is presumed whether there is a problem in the settings or the like on the AV amplifier 20 side, based on the events relating to the HDMI data (audio data) transmitted from the HDMI transmission unit 13. However, in S16, it is determined whether there is a problem in the settings or the like on the AV amplifier 20 side, based on the EDID acquired from the AV amplifier 20, so the possibility of solving the problem in S16 is higher than the case of S14. Accordingly, the priority of S16 is set to be higher than the priority of S14. Information in the EDID used in this case includes the format of audio data which can be played by the AV amplifier 20, the sampling frequency of the format of the audio data which can be played, and the like.

Figure 11:
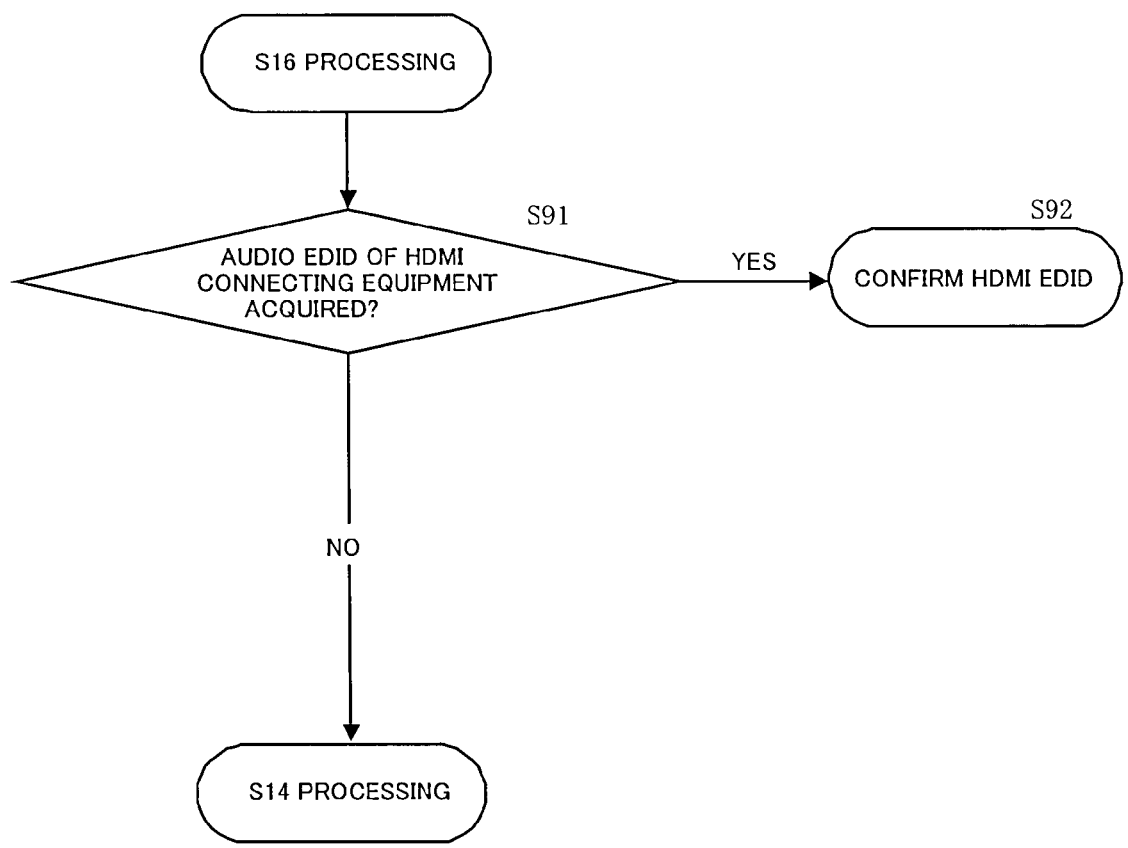
FIG. 11 is a flowchart showing determination processing based on EDID.
Figure 12:
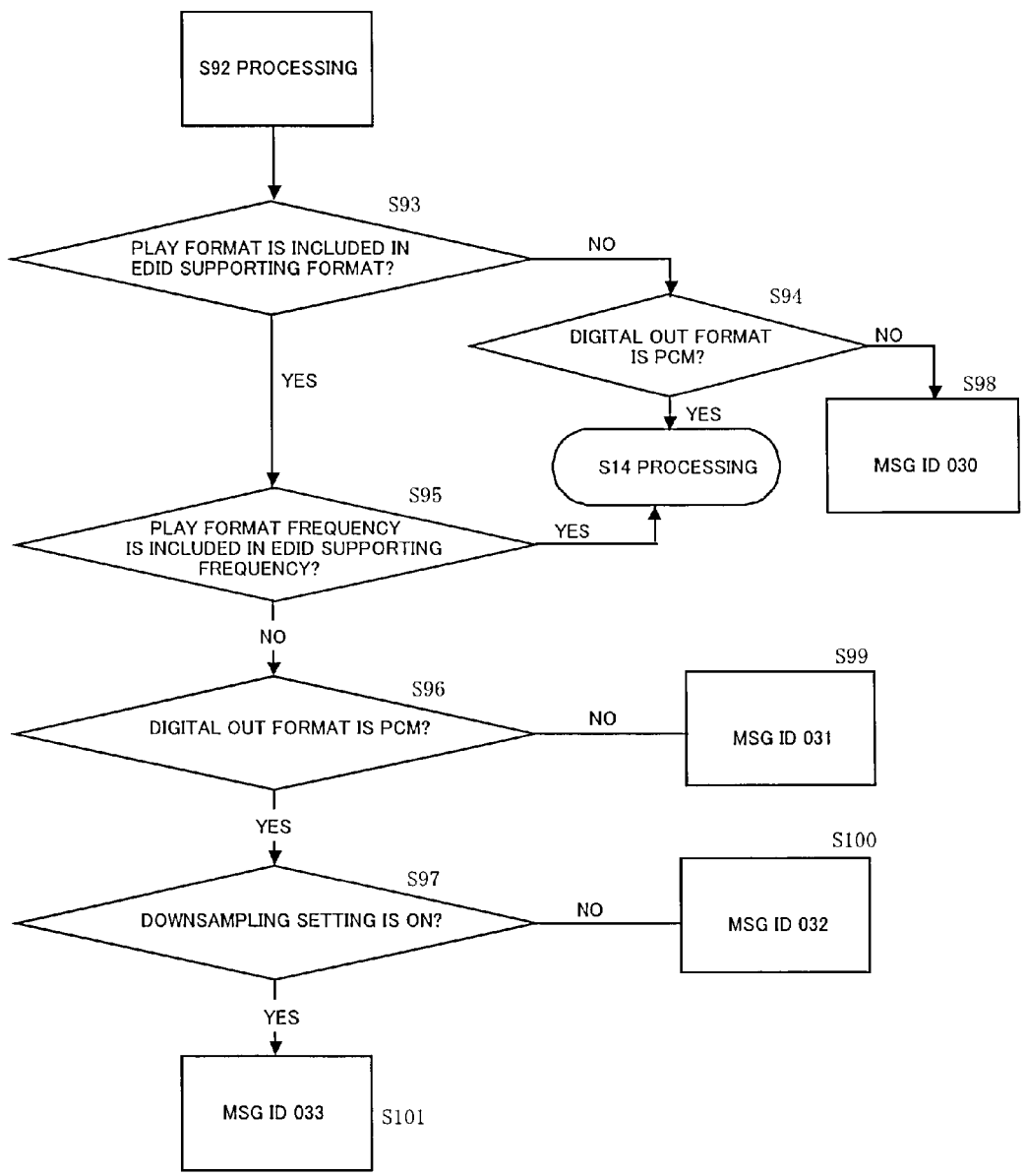
FIG. 12 is a flowchart showing the details of EDID confirmation processing.

The processing of S16 will be described with reference to FIG. 11. The system controller 14 determines whether EDID has already been acquired from the AV amplifier 20 (S91). If EDID has not been acquired (S91: NO), the system controller 14 ends the processing of S16, and proceeds to the processing of S14. If the EDID has been acquired (S91: YES), the system controller 14 performs EDID confirmation processing (S92). FIG. 12 shows the detail of S92.

The system controller 14 determines whether the format of the audio data currently played is included in the playable format in the EDID (S93). If it is not included (S93: NO), the system controller 14 determines whether the format of the digital audio data is PCM (S94). If it is PCM (S94: YES), the AV amplifier 20 must be able to support PCM so there is no problem, so the system controller 14 proceeds to the processing of S14. On the other hand, if it is not PCM (S94: NO), it is found that the AV amplifier 20 does not support the format being played. Therefore, the system controller 14 displays a message "Connected HDMI equipment does not support this format. Please change Digital Out setting to PCM setting", the message ID of which is 030, on the operation display unit 15.

If the format of the audio data being played is included in the playable format in the EDID (S93: YES), the system controller 14 determines whether the sampling frequency of the format of the audio data being played is included in the playable sampling frequency in the EDID (S95). If it is included (S95: YES), there is no problem, so the system controller 14 proceeds to the processing of S14. On the other hand, if it is not included (S95: NO), the system controller 14 determines whether the format of the digital audio data is PCM (S96). If it is not PCM (S96: NO), the system controller 14 displays a message "HDMI connecting device does not support this play format. Please change to digital connection or analog connection", the message ID of which is 031, on the operation display unit 15.

On the other hand, if it is PCM (S96: YES), the system controller 14 determines whether the downsampling setting is ON (S97). If the downsampling setting is OFF (S97: NO), the system controller 14 displays a message "Please set downsampling setting to ON", the message ID of which is 032, on the operation display unit 15. On the other hand, if the downsampling setting is ON (S97: YES), the system controller 14 displays a message "HDMI equipment does not support this frequency. Please change to digital connection or analog connection", the message ID of which is 033, on the operation display unit 15.

As described above, in the present embodiment, determination of whether to correspond to each event is performed based on the EDID acquired from the AV amplifier 20, and if it corresponds, the associated message is displayed. Thereby, the problem can be solved more securely. Note that the information in the EDID used in this embodiment may include speaker settings and audio settings. Further, determination processing relating to events of video data of the AV amplifier 20 may be performed based on the EDID.

Although the preferred embodiments of the present invention have been described, the present invention is not limited to these embodiments. The message display button may be a button on the main body of the DVD player 10 or a button on a remote controller. The time to display a message may be a prescribed time (e.g., 5 seconds) or a time until the user cancels the display. It is also acceptable that the event determination unit 14*a*, the message display control unit 14*b* and a message table are set in the AV amplifier 20 or the display device, and the AV amplifier or the display device perform the event determination processing and the message display processing. Further, the audio-video receiver may be a display device instead of an AV amplifier. Of course, it is acceptable to determine events opposite to the respective events (e.g., in S42 of FIG. 5A, an event that digital audio data (digital audio data from digital cable) is outputted from the HDMI transmission unit 13) so as to reverse YES/NO of the flowcharts. Further, it is also acceptable not only to display the messages but also to display inquiries relating to setting changes (setting change button) to thereby enable a user to change the setting immediately when the setting change button is selected. Moreover, the present invention may be provided in the form of a program to cause a computer to perform the operation of a DVD player, and a record medium storing it. Note that HDMI, DTS, and Dolby Digital are registered trademarks.

Industrial Applicability

The present invention is particularly applicable, in a preferred manner, to a DVD player conforming to the HDMI standard in which the setting operation is difficult.

What is claimed is:

1. An audio-video player connectable to an audio-video receiver comprising:
    a playback unit which plays audio data and video data;
    a transmission unit which transmits audio data and video data to the audio-video receiver connected outside;
    a message storing unit which stores prescribed messages in advance by associating them with a plurality of events with prescribed priorities;
    an event determination unit which sequentially determines whether each of the events corresponds, starting from an event of higher priority; and
    a display unit which reads out a prescribed message associated with a corresponding event from the message storing unit when the event determination unit found the corresponding event, and displays it, wherein the plurality of events includes a first event relating to transmission of audio data and video data of the audio-video player, and a second event relating to reception of audio data and video data of the audio-video receiver having lower priority than that of the first event, the event determination unit determines whether the first event and the second event correspond based on a present status of the audio-video player, in a case of corresponding to the first event, the display unit displays a message urging a user to change setting of the audio-video player; and in a case of corresponding to the second event, the display unit displays a message urging the user to change setting of the audio-video receiver.

2. The audio-video player according to claim 1, wherein the first event includes a third event relating to transmission of audio data of the audio-video player and a fourth event relating to transmission of video data of the audio-video player having lower priority than that of the third event, and the second event includes a fifth event relating to reception of audio data of the audio-video receiver, and a sixth event relating to reception of video data of the audio-video receiver having lower priority than that of the fifth event.

3. The audio-video player according to claim 1, wherein the plurality of events further includes a seventh event relating to a connection between the audio-video player and the audio-video receiver, having higher priority than those of the first event and the second event.

4. The audio-video player according to claim 2, further comprising a resolution converter which converts resolution of video data played by the playback unit, wherein the fourth event or the sixth event is an event relating to resolution converted by the resolution converter.

5. The audio-video player according to claim 2, wherein the audio-video player and the audio-video receiver conform to HDMI standard, the transmission unit converts audio data and video data played by the playback unit to HDMI data conforming to the HDMI standard, and transmits it to the audio-video receiver, the third event includes an event that the transmission unit is outputting HDMI audio data, and if an event that the transmission unit is outputting HDMI audio data corresponds, the event determination unit ends determination of the third event and determines the fourth event.

6. The audio-video player according to claim 5, wherein the third event further includes an event that the transmission unit is not outputting digital audio data and an event relating to audio data played by the playback unit, and if an event that the transmission unit is outputting HDMI data does not correspond but an event that the transmission unit is not outputting digital audio data corresponds, the event determination unit determines an event relating to audio data played by the playback unit.

7. The audio-video player according to claim 6, wherein the third event further includes an event that a format of audio data outputted by the transmission unit is PCM, and an event that a sampling frequency of PCM audio data outputted by the transmission unit is not a prescribed frequency, and if an event that the transmission unit is outputting HDMI data and an event that the transmission unit is not outputting digital audio data do not correspond but an event that the format of the audio data outputted by the transmission unit is PCM corresponds, the event determination unit determines an event that the sampling frequency of the PCM audio data outputted by the transmission unit is not a prescribed frequency.

8. The audio-video player according to claim 5, wherein the fifth event further includes an event that a format of audio data of HDMI data outputted by the transmission unit is a prescribed format.

\* \* \* \* \*